Oct. 3, 1961   G. G. BLUEMINK   3,002,794
MOTOR BEARING ORGANIZATION
Filed Oct. 14, 1957
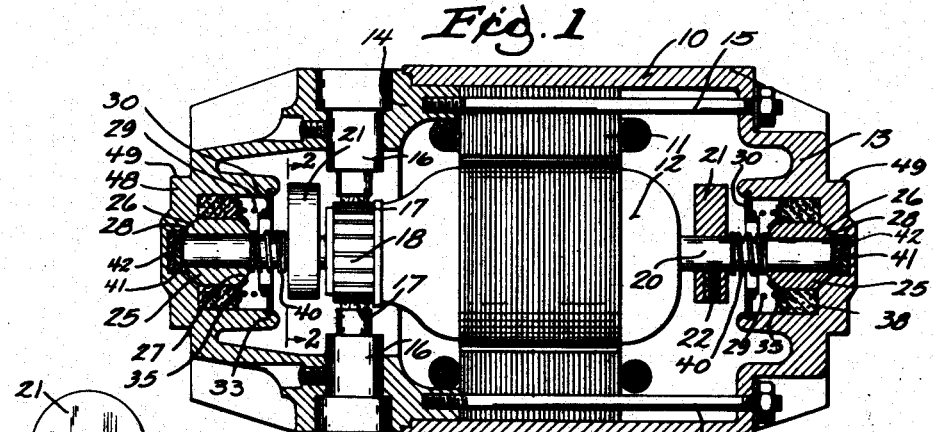
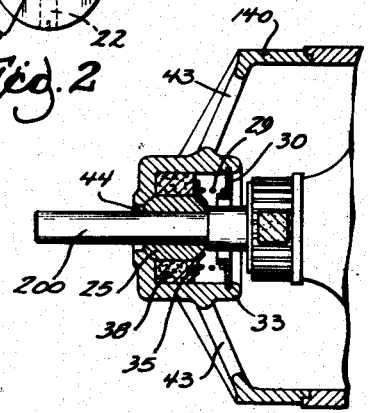
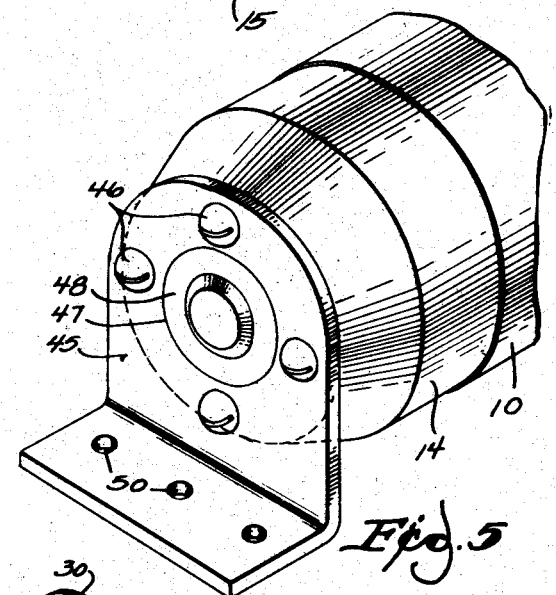
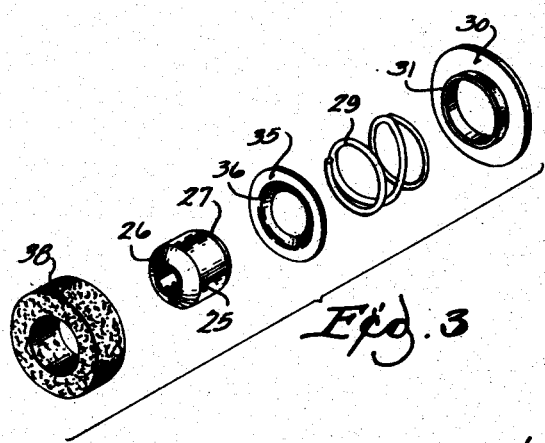
INVENTOR.
GARY G. BLUEMINK
BY
Wheeler, Wheeler & Wheeler
ATTORNEYS

United States Patent Office 3,002,794
Patented Oct. 3, 1961

3,002,794
MOTOR BEARING ORGANIZATION
Gary Groot Bluemink, Racine, Wis., assignor to Howard Industries, Inc., Racine, Wis., a corporation of Wisconsin
Filed Oct. 14, 1957, Ser. No. 690,070
6 Claims. (Cl. 308—72)

This invention relates to a motor bearing organization.

The motor is used for effecting vibration and carries eccentric weights on its armature shaft. In order to develop a curtate cycloid motion, the weights are disposed between the motor armature and the armature shaft bearings, and the bearings are of a particular design which provides long life and permanent lubrication.

The motor casing ends are socketed to receive the bearing structure, and the socket is counterbored to provide a spherical surface in which a sintered bronze bearing member is received, the bearing member having spherically rounded ends and being sleeved onto the armature shaft.

Externally of the bearing member is a porous ring of felt or the like seated in the socket of the motor casing end and held there by a metal washer which serves as a spring seat and has a portion engaging the felt ring and another portion floating on the spherical end of the bearing member. A spring seated on the washer is also seated on an annular member permanently mounted in the motor casing end for the purpose. This member has sufficient internal clearance from the armature shaft to accommodate a second spring interposed under pressure between the eccentric weight and the bearing and tending to keep the armature shaft centered. A disc of nylon or the like and a cushion disc of felt or the like are pocketed in the motor casing end wall opposite the end of the shaft to absorb any axial displacement which may occur notwithstanding the centering of the spring. The felt tends to absorb oil which is squeezed from it in response to axial thrust from the shaft to contribute to the further lubrication of the bearing parts. The small amount of oil released flows around the nylon disc. When the pressure is relieved, the felt disc reabsorbs this oil for future use.

For general motor purposes, the eccentric weights may be omitted and the armature shaft extended from the casing, the particular bearing structure having advantages in such an organization also.

In the drawings:

FIG. 1 is a view in axial section through a vibrating motor embodying the invention.

FIG. 2 is a detail view of the eccentric weight as shown in elevation on the line indicated at 2—2 in FIG. 1, the shaft being shown in section.

FIG. 3 is an enlarged detail view in perspective showing in relatively separated positions the component parts used in the bearing.

FIG. 4 is a fragmentary view similar to FIG. 1 showing a modified embodiment of the invention which uses no vibratory weight.

FIG. 5 is an enlarged detail view fragmentarily illustrating the end of a motor such as that shown in FIG. 1 to illustrate one manner in which the motor may be mounted for use.

The motor casing 10 comprises a sleeve within which the motor field 11 is mounted to encircle the armature 12. In the device illustrated, the sleeve portion 10 of the motor casing is integral with one of the ends 13, the other end 14 being anchored in place by tension bolts 15. The detachable end member 14 is equipped with brush carriers 16 wherein the brushes 17 engage the commutator 18 in the usual way. The commutator and the armature 12 are mounted on an armature shaft 20 which is provided with eccentric weights at 21 desirably fixed to the shaft 20 by setscrews 22. The bearings for the armature shaft 20 in the relatively fixed intermovable ends 13 and 14 of the casing may be identical.

At each end the shaft 20 bears in a porous metal bushing 25 such as is commonly made of sintered bronze to receive and hold a considerable quantity of oil for the lubrication of the shaft. In the present device, the bearing member of bushing 25 has at least one and desirably two spherically finished ends 26, 27. The spherically finished end 26 seats in a spherically concave socket provided at 28 in the casing end wall. The bearing 25 is held in the socket by the pressure of a compression spring 29 which seats at its inner end against an annular member 30 which has a spring locating flange 31 encircled by the end coil of compression spring 29. The outer periphery of the outer spring seat 30 is anchored into the annular flange 33 of the casing end wall, the end of which is swedged or otherwise deformed about the periphery of the annulus 30.

The outer end of compression spring 29 seats against a washer 35 which has a spherical surface at 36 engaged with, and complementary to, the spherical bearing surface 27 of the bearing member 25. The peripheral flange of washer 35 confines a ring 38 of felt or the like which encircles the bearing member 25 and is soaked with oil to maintain the sintered bearing member full of lubricant and provide lifetime lubrication for the motor.

For some purposes, a compression spring 40 is used between each of the counterweights 21 and the associated bearing member 25. This tends to maintain the armature shaft 20 centered between, and normally out of contact with, the thrust members 41 which are seated against the felt discs in the sockets in the casing ends 13 and 14 beyond the spherically finished bearing surfaces 26 with which such ends are provided. The thrust inserts 41 may be made of nylon or the like. They are capable of withstanding armature shaft friction for long periods but are seldom called upon to perform this function because of the centering of the shaft by the springs 40.

The discs 42 in the bearing sockets may conveniently be made of felt or the like. They absorb and retain lubricant, releasing it only under end pressure of the shaft and reabsorbing it when the end pressure is relieved.

In the construction shown in FIG. 4, the special end wall member 140 has openings for air circulation at 43 and the armature shaft 200 is extended through an opening at 44, there being no thrust member at this point. Otherwise the structure is similar to that already described.

Either motor may be mounted for use in any appropriate manner. In FIG. 5 I have shown one arrangement for mounting the motor of FIGS. 1 to 3 by the use of end brackets such as that illustrated at 45. The bracket shown is attached by screws 46 to the casing end 14 and has a circular opening at 47 through which the terminal portion 48 of the casing end projects, the shoulder 49 of the casing end (FIG. 1) seating within the opening 47 of the bracket 45. The bracket has mounting holes at 50 for connection to any supporting structure.

The motor as shown produces curtate cycloid vibration in the course of rotation of its armature shaft. Whether this is due to the particular form of the weights or to the particular construction of the bearing is not known, but the vibration appears to be different in kind from common cycloid vibration such as is developed by most eccentrically loaded motors. Whether the vibration is common cycloid vibration or curtate cycloid vibration, the bearings illustrated are long lived and sturdy and the novel way in which the bearing members are mounted makes them very desirable for use with an eccentrically loaded armature shaft. Of course the qualities that make the bearing suitable for this type of service give it extraordinarily long life as applied to a conventional motor in which the armature shaft operates in balance.

I claim:

1. In a motor the combination with a casing end wall, of a spring seat washer peripherally anchored in said casing end wall, said casing end wall having a recess partially closed by the spring seat washer, a shaft extending into the recess through the washer, a bearing member into which the shaft extends and which is provided with an annular spherically surfaced end face for which the casing end wall has a complementary face within the recess, the bearing member having a spherical surface at its opposite end, a floating spring seat washer having a spherical face complementary to the last mentioned spherical surface of the bearing member and engaged therewith, a compression spring disposed between and seated upon the first mentioned spring seat washer and said floating spring seat washer, and a lubricating ring encircling the bearing member and substantially filling the recess and with which a portion of the floating spring seat washer is engaged to confine the ring within the recess, the floating spring seat washer bearing on a major portion of the surface of the lubricating ring for limiting distortion thereof by movement of said bearing member, the casing end having a counterbore in line with the shaft and toward which the shaft projects beyond the bearing member, a thrust element within the counterbore in a position to engage the shaft in the event of axial shaft displacement into the counterbore, and opposed spring means biasing said shaft and adapted normally to maintain its center against axial displacement in the counterbore and in a position in which the shaft is spaced from said thrust element.

2. The device of claim 1 in which the shaft has spring seat means rotatable with it and a second compression spring confined between the bearing member and the spring seat means together with separate means biasing the shaft in opposition to the last mentioned spring whereby to tend to maintain the shaft centered and free of contact with the thrust bearing element in the counterbore.

3. In a motor of the vibratory type, the combination with an armature shaft provided at points spaced from its respective ends with eccentric weights, of a casing having opposing ends provided with inwardly extending sleeves within which the ends of the shaft are centered, bearings encircling the end portions of the shaft and provided with convex ends, the ends of the casing having complementary surfaces with which the convex ends of the bearings are engaged, annular lubricant retainers encircling the bearings and disposed within the respective sleeves, spring seat washers peripherally fixed to the respective inner ends of the sleeves, compression springs seated against said washers, collars engaged by respective springs and having concave portions complementary to the convex inner ends of the respective bearings, said collars further having radial flange portions engaging the respective lubricant retainers, and compression springs confined between the respective bearings and the respective eccentric counterweights on said shaft, said springs tending to maintain the shaft centered between said bearings.

4. The device of claim 3 in which the ends of the shaft extend through said bearings, the end portions of the casing being socketed to receive such ends, and in further combination with thrust disks engaged by the respective shaft ends and disposed in the respective sockets of the casing, and compressible absorbent lubricant pads disposed in the respective sockets and engaged by the respective thrust disks and adapted to receive and expel lubricant in the endwise movement of the shaft.

5. In a motor the combination with a casing having an end provided with a spherical seat and an annular flange spaced radially from said seat and extending inwardly, of an armature shaft provided with a bearing member having a spherical end complementary to said seat and seated thereon, said annular flange being spaced circumferentially about said member, a lubricant-absorptive ring fitted to the space between said flange and said bearing member and engaged with the casing end, and means for yieldably holding the bearing member to the casing end and confining said ring in abutment with inner and outer surfaces provided by said flange and bearing member and an end surface provided by said casing end, said last mentioned means comprising a pair of spring seat washers one of which is engaged both with the end of the bearing member and with a major portion of the end of said ring, the other spring seat washer comprising an annulus through which the armature shaft extends and which has its outer periphery fixed in connection with said flange, and a compression spring confined in pressure engagement between the respective washers and encircling said armature shaft, said flange having a groove into which the periphery of the annular spring seat washer extends, the material of the flange confining the periphery of the spring seat washer in the groove and constituting means for fixing the position of the spring seat washer respecting the flange as aforesaid.

6. In a motor the combination with a casing having an end provided with a spherical seat and an annular flange spaced radially from said seat and extending inwardly, of an armature shaft provided with a bearing member having a spherical end complementary to said seat and seated thereon, said annular flange being spaced circumferentially about said member, a lubricant-absorptive ring fitted to the space between said flange and said bearing member and engaged with the casing end, and means for yieldably holding the bearing member to the casing end and confining said ring in abutment with inner and outer surfaces provided by said flange and bearing member and an end surface provided by said casing end, said motor casing end having a counterbore providing a socket opening through said spherical seat in registry with the armature shaft, a lubricant-absorptive disk fitted into the end of the counterbore, and a thrust disk engaging the lubricant-absorptive disk and engaged by the end of said armature.

References Cited in the file of this patent

UNITED STATES PATENTS

| | | |
|---|---|---|
| 1,132,992 | Wood | Mar. 23, 1915 |
| 1,508,824 | Schramm | Sept. 16, 1924 |
| 1,987,178 | Brown | Jan. 8, 1935 |
| 2,009,124 | Skolfield | July 23, 1935 |
| 2,130,826 | Franks | Sept. 30, 1938 |
| 2,139,373 | McKinley et al. | Dec. 6, 1938 |
| 2,253,110 | Cornell | Aug. 19, 1941 |
| 2,668,086 | Marzolf | Feb. 2, 1954 |
| 2,792,512 | Koch | May 14, 1957 |
| 2,813,762 | Bridenbaugh | Nov. 19, 1957 |
| 2,819,933 | Carrington | Jan. 14, 1958 |

FOREIGN PATENTS

| | | |
|---|---|---|
| 244,387 | Germany | Mar. 9, 1912 |
| 570,424 | Germany | June 4, 1932 |